United States Patent [19]

Ott et al.

[11] 4,115,191
[45] Sep. 19, 1978

[54] TOKAMAK PLASMA HEATING WITH INTENSE, PULSED, ION BEAMS

[75] Inventors: Edward Ott, Ithaca, N.Y.; Wallace M. Manheimer, Silver Spring, Md.

[73] Assignee: The United States of America as represented by the Secretary of the Navy, Washington, D.C.

[21] Appl. No.: 806,382

[22] Filed: Jun. 14, 1977

[51] Int. Cl.$^2$ .................................................. G21B 1/00
[52] U.S. Cl. .................................................. 176/3; 176/5
[58] Field of Search .................................................. 176/3, 5

[56] References Cited

U.S. PATENT DOCUMENTS

| 3,624,240 | 10/1971 | Damm et al. | 176/3 |
| 3,663,361 | 5/1972 | Yoshikawa | 176/3 |
| 3,713,967 | 1/1973 | Hamilton et al. | 176/3 |

OTHER PUBLICATIONS

"Plasma Injection and Confinement in a Toroidal Octopole Field," de la Fuente et al., pp. 1–14 (6/9/75).
Physics of Fluids, vol. 8, No. 4, (4/65), pp. 713–722, Baker et al.
Plasma Stream Penetration of Shorted Magnetic Field Lines, 11/67, Barney et al.
IAEA-CN-33/A 4-1, pp. 77–82, Bol et al., 11/74, Neutral Beam Heating in ATC.
IAEA-CN-35/A4-1, 10/76, Berry et al., pp. 49–68, Confinement and Neutral Beam Injection Studies in Ormak.
MATT-1087, 1/75, Bol et al., pp. 1–6.
Pulsed Fusion Reactors, 9/74, Pergamon Press Eur 5307e, pp. 99, 103.
S0234-0018, 9/70, Turner, Theta-Pinch Plasma Gun for High Beta Injection.
Conceptual Design of Neutral Beam Injection System for TFTR, Ehlers et al., 11/75, pp. 855–859.
Conf-740402-P1, vol. 1, 4/74, pp. 365–391.

Primary Examiner—Samuel W. Engle
Assistant Examiner—S. A. Cangialosi
Attorney, Agent, or Firm—R. S. Sciascia; Philip Schneider; David Rasmussen

[57] ABSTRACT

An intense, space-charge-neutralized, pulsed ion beam is used to heat a magnetically-confined plasma, such as a tokamak plasma, by injecting the ion beam into the plasma along a trajectory that is generally perpendicular to the confining magnetic field. For proper beam parameters, the ion beam will propagate across the magnetic field in the vacuum region, penetrate the confined plasma, and deposit its energy in the interior of the plasma.

3 Claims, 6 Drawing Figures

TOKAMAK PLASMA HEATING WITH INTENSE, PULSED, ION BEAMS

BACKGROUND OF THE INVENTION

This invention relates in general to methods and apparatus for transferring energy to a magnetically-confined plasma. More particularly, this invention relates to a method and apparatus for heating a tokamak-confined plasma to thermonuclear temperatures by injecting an intense, pulsed, space-charge-neutralized ion beam into the plasma.

Various techniques of heating tokamak-confined plasmas have been proposed in controlled thermonuclear fusion research in an effort to provide an ionized gaseous plasma of sufficient density and temperature to sustain fusion reactions. Heretofore such reactor conditions have not been attained because insufficient heating, plasma-confinement instabilities, and energy loss mechanisms prevent the plasma from reaching the required temperatures.

It is generally agreed that ohmic heating by the main plasma current is ineffective near reactor temperatures because the plasma resistivity is a sharply decreasing function of temperature. Current experiments now show that ohmically-heated tokamaks do fall far short of reactor temperatures.

Since ohmic heating is insufficient, supplementary heating is required and techniques such as heating with neutral beams, intense electron beams, and microwave power have been proposed. It is necessary that the power produced by these supplementary techniques be deposited near the center of the reactor plasma so that the energy is confined in the plasma and does not escape out of the plasma to the walls of the tokamak, thus introducing impurities from the wall into the system. These impurities, at best, cause inefficient heating or may even result in the cooling of the confined plasma.

The injection of neutral beams into the confining magnetic field is currently regarded as the most promising method of supplementary heating. However, neutral beams can only be efficiently produced for energies less than 160 keV for deuterons (80 keV for protons). Considerably larger energies are needed if the neutral beam is to be deposited near the center of the reactor plasma. The injection of intense relativistic electron beams is a possible means of heating tokamak plasmas. However, the beam of electrons must be transported across the large magnetic field which exists in the tokamak. Because of the small mass of the electrons, this is a very difficult problem which remains to be solved. Microwave power can be delivered to the tokamak by waveguides attached to openings in the side walls, or by large coil structures inside the main vacuum chamber. This approach is limited by difficulty in controlling where in the plasma the microwave power is deposited, and also by anomalous scattering or anomalous absorption of the microwave power in the outer regions of the plasma due to parametric instabilities.

SUMMARY OF THE INVENTION

The present invention provides for heating a reactor plasma by the injection of an intense, pulsed ion beam into the plasma. The present invention has the advantage that ion beams can be produced efficiently over a wide range of voltages, currents and beam radii. The location at which the ion beam deposits its energy in the plasma can be controlled by adjusting the beam parameters. Ion beams are characterized by enormous power and very short delivery time. Since they are pulsed almost instantaneously as compared to the lifetime of the plasma, the energy may be delivered very quickly and at particular times during the plasma lifetime.

A conventional pulsed ion accelerator, such as a reflex triode, provides a space-charge-neutralized ion beam which then propagates in a conventional manner in a guide tube which is attached to an opening in the side wall of the tokamak. The intense, space-charge-neutralized ion beam will propagate from the guide tube cross the vacuum magnetic field region of the tokamak to the tokamak plasma if $\omega_{pi}^2 >> \Omega_i^2$ where $\omega_{pi}$ and $\Omega_i$ are the ion plasma and gyrofrequencies the beam, respectively. The ion beam will penetrate the tokamak plasma if the beam energy density is larger than the tokamak magnetic-field energy density. The proper relationship is obtained if $V_o/V_A > 1$, where $V_o$ is the velocity of the beam and $V_A$ is the Alfven speed of the beam in the magnetic field. The ion beam can then deposit its energy in the plasma, most likely by exciting a Kelvin-Helmholtz or ion-ion instability. The beam velocity $V_o$ must be less than $2\sqrt{2}\, V_A$ for the Kelvin-Helmholtz instability or less than $2\, V_A$ for the ion-ion instability. Thus the ion beam required by the present invention is characterized by $\omega_{pi}^2 >> \Omega_i^2$ and $V_A < V_o \simeq 2\sqrt{2}\, V_A$.

Additional advantages and features will become apparent as the subject invention becomes better understood by reference to the following detailed description when considered in conjunction with the accompanying drawings wherein:

DESCRIPTION OF THE PREFERRED EMBODIMENT

Figure 2:
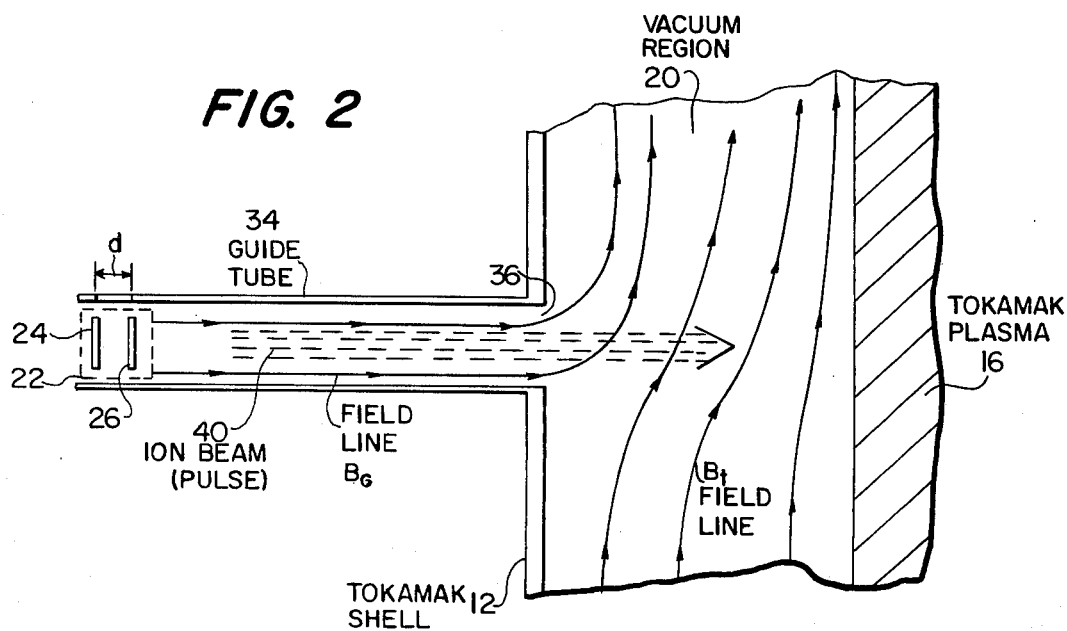
FIG. 2 is a cut-away elevation view illustrating the magnetic field lines in the guide tube and the tokamak

Referring now to the drawings wherein like reference characters refer to like or corresponding parts throughout the several views and, more particularly to FIG. 2, there is illustrated a basic tokamak magnetic field apparatus 10 including a toroidal shell 12 defining an endless chamber 14. The chamber 14 is evacuated to a high vacuum and a plasma 16 (hereinafter also referred to as the tokamak plasma) is established in the chamber by means not shown. The tokamak plasma of major radius R and minor radius $r_o$ is confined within the shell 12 in a helical magnetic field B created by the superposition of a strong, externally generated toroidal field $B_t$ and a poloidal field $B_p$ generated by the plasma current I. (The characters B, $B_p$, and $B_t$ are used here to denote the vector magnetic fields.) A toroidal winding 18, energized by a direct current voltage source, not shown, establishes the toroidal (longitudinal) magnetic field $B_t$ while the plasma current I is induced by tran former action (the plasma acts as a transformer section winding) produced by primary windings and transformer core (also not shown) disposed in proximity to the toroidal shell 12. A vacuum region 20 surrounds the plasma 16 in the chamber 14.

Although the plasma current has the basic function of providing the rotational transform needed for plasma equilibrium, it has the incidental benefit of ohmically heating the tokamak plasma to temperatures on the order of 1 keV. However, since much higher temperatures are required to sustain a thermonuclear reaction (approximately 10 keV in the case of a T, D type reaction), additional heating of the tokamak plasma is required.

In the present invention an intense, space-charge-neutralized, pulsed ion beam is utilized to heat the tokamak plasma; that is, the intense ion beam is injected into the tokamak 10 and deposits its energy in the tokamak plasma 16. The term "space-charge-neutralized" is used herein to indicate that the intense ion beam contains an equal number of ions and electrons (although the electrons may be of much lower energy than the ions) so that the beam used in the present invention may be thought of as an intense, neutral, plasma beam. In order to heat a tokamak plasma by injecting a space-charge-neutralized, pulsed ion beam into the tokamak plasma, three things must be accomplished: first, an ion beam having the required characteristics (these characteristics will be explained hereinafter) must be produced; second, the ion beam must propagate to the tokamak and must propagate across the magnetic field in the vacuum region of the tokamak; and third, the ion beam must penetrate the tokamak plasma and deposit its energy therein.

Considering first the production of an ion beam having the proper characteristics, in general, an electron beam and an ion beam may be generated in an ion accelerator which includes an anode and a cathode separated by an anode-cathode gap and in which the anode and cathode are capable of emitting ions and electrons, respectively. Until recently, the ratio of power delivered to the ion beam to the power delivered to the electron beam was low; however, advances in ion accelerators have greatly increased the portion of the energy delivered to the anode-cathode gap which goes to producing the ion beam.

Figure 1:
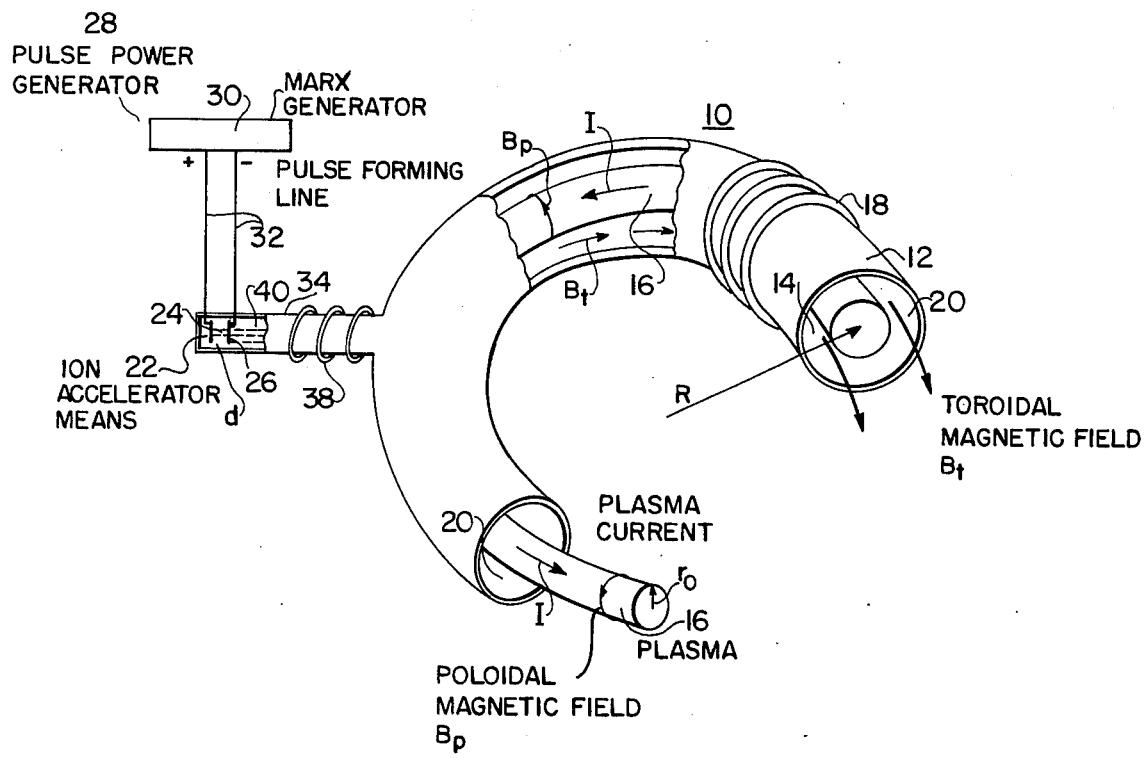
FIG. 1 is an isometric partially cut-away view of a typical tokamak magnetic field apparatus showing the ion-beam injection system of the present invention.

Referring still to FIG. 1, the preferred embodiment of the present invention includes a pulsed ion-accelerator means 22 of the type capable of producing an intense, space-charge-neutralized ion beam. A reflex triode or a pinched electron diode is suitable for use as ion-accelerator means 22. For a discussion of the design and operation of a reflex triode and a pinched electron diode, reference is made to "Advances in the efficient generation of pulsed proton beams" by S. Humphries et al., Journal of Applied Physics, Vol. 46, No. 1, (1975), and to "Ion-Induced Pinch and the Enhancement of Ion Current by Pinched Electron Flow in Relativistic Diodes" By S. A. Goldstein et al., Physical Review Letters, Vol. 35, No. 16 (1975), respectively. Typically, ion-accelerator means 22 will include an anode 24 and a cathode 26 separated by an anode-cathode gap $d$. The ion-accelerator means 22 is energized by a pulsed power generator 28 which typically includes a capacitor bank connected in the form of a conventional Marx generator or pulse transformer 30 and a conventional pulse-forming line 32. Marx generator 30 provides the high voltage necessary to generate the intense ion beam and pulse-forming line 32 provides rapid delivery of the energy to the ion-accelerator means 22. Reference is made to "Pulsed Power Technology for Controlled Thermonuclear Fusion" by L. S. Levine et al., IEEE Transactions on Nuclear Science NS-18, 255 (1971) for a discussion of the design and operation of pulsed power generator 28.

The ion-accelerator means 22 is situated in a guide tube 34 which leads to an opening 36 (see FIG. 2) in a side wall of the tokamak shell 12. The ion accelerator means 22 and the guide tube 34 are subjected to a longitudinal magnetic field $B_G$ generated by guide tube winding 38 (energized by a direct current supply not shown).

The operation of the ion-accelerator means 22 will now be briefly described. Upon being energized by the pulsed-power generator 30, an ion current is drawn from the anode 24 and passes through the cathode 26. The ion accelerator means 22 is designed so that the ion beam to electron beam current ratio is enhanced by preventing the generation of electron current as is explained in the Humphries et al. and the Goldstein et al. articles, previously cited. The ion beam, represented by dashed lines 40, emerging from the cathode 26 is neutralized by electrons dragged off plasma which has been formed on the outside surface of the cathode. In the case of an ion accelerator having a planar anode-cathode gap $d$ (in centimeters) with an applied voltage V (in megavolts), according to the Langmuir-Child law, the ion current density produced (in amperes/cm²) is $$j_{LC} = \frac{(1.85)(4)}{9} \epsilon_o \left(\frac{2e}{M}\right)^{1/2} \frac{V^{3/2}}{d^2}$$

or $$j_{LC} = 60 \frac{V^{3/2}}{d^2}$$

where $\epsilon_o$ is the permittivity of free space,

M is the mass of a proton (in MKS units), and e is the charge of a proton (in MKS units), if it is assumed that no electrons are present in the gap. In fact, the presence of electrons in the gap $d$ allows the possibility that the space-charge-limited ion current can be enhanced by a factor $\alpha$ ($\alpha = j_i/j_{LC}$, where $j_i$ is the actual current density). For example, reflex triode operation with enhancement factors of approximately 100 has been observed.

Considering now the injection of the space-charge-neutralized ion beam 40 into the tokomak 10, reference is made to FIG. 2. The pulsed ion-accelerator means 22, such as a reflex triode, is shown situated in the guide tube 34 which leads to the opening 36 in the side wall of the tokamak shell 12. The ion beam 40 emerging from the anode 24 and passing through the cathode 26 (neutralized as previously indicated by dragging electrons from the cathode) will propagate down the guide tube 34. At the end of guide tube 34, the magnetic field in the guide tube $B_G$ (as generated by guide tube winding 38) merges with the tokamak magnetic field B. The field lines, as traversed by the ion beam 40 propagating through the guide tube 36 into the tokamak, curve to eventually be at right angles to the initial beam velocity. Thus the ion beam 40 must propagate across the vacuum magnetic field region 20 to reach the plasma.

Figure 3:
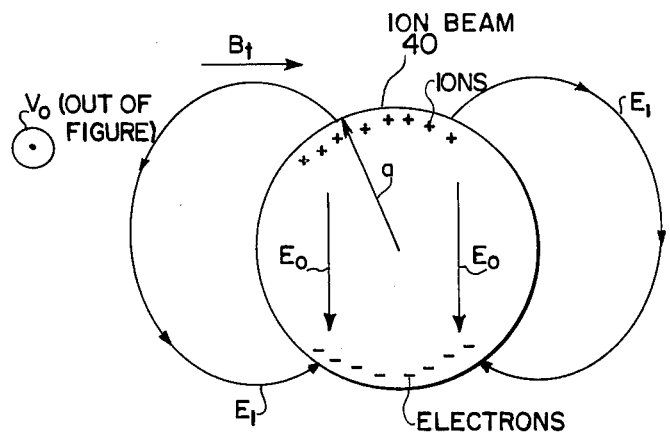
FIG. 3 shows a cross-section of the ion beam illustrating charge separation in the beam in the vacuum region of the tokamak.

As is well known, a neutralized group of ions and electrons can move across a vacuum magnetic field essentially unimpeded, if $\omega_{pi}^2 >> \Omega_i^2$, where $\omega_{pi}$ and $\Omega_i$ are the ion plasma frequency and gyrofrequency of the ion beam 40, respectively. In MKS units, $\omega_{pi}^2 = ne^2/\epsilon_o M$ and $\Omega_i^2 = eB/M$, where $e$ is the proton charge, $M$ is the proton mass, $B$ is the magnetic field strength, $\epsilon_o$ is the permittivity of free space, and $n$ is the beam density. As illustrated in FIG. 3 which shows a cross-section of the beam 40 within the vacuum region 20 (as viewed from the tokamak toward the guide tube 34), for $\omega_{pi}^2 >> \Omega_i^2$), charge separation within the beam due to adiabatic guiding center inertial drifts will set up a polarization field in the beam $$E_o \approx -V_o \times B$$

where $V_o$ is the beam velocity in the guide tube.

In order for the foregoing relationships to be valid, the beam density $n$ must be sufficiently large that $\omega_{pi}^2 >> \Omega_i^2$. From the Lanzmuir-Child law the beam density is $$n = j_{LC}/eV_o \qquad (2)$$

where
$j_{LC}$ is the ion current density, and
$e$ is the proton charge.

Substituting for the ion current density $j_{LC}$ from equation (1) and substituting $\sqrt{2eV/M}$ for the beam velocity $V_o$, gives a beam density $$n \approx (3 \times 10^{11}) \alpha\, V/d^2 \text{ (cm}^{-3}) \qquad (3)$$

where $V$ (the applied voltage) is in megavolts and $d$ (the anode-cathode gap) is in centimeters and the enhancement factor $\alpha$ has been included.

It will be apparent to persons skilled in the art that $n$ can be increased by converging the magnetic field $B_G$ in the guide tube 34. As will be evident from the example treated hereinafter, the condition $\omega_{pi}^2 >> \Omega_i^2$ can easily be achieved. It is further noted that if the ions emerging from ion accelerator means 22 are not space-charge-neutralized by the addition of electrons, they will only propagate (in the vacuum region 20) a distance on the order of their Larmor radius, a distance too short to be of interest in this application.

As was shown above, when the ion beam 40 passes from the guide tube 34 into the tokomak 10 in which it propagates perpendicular to B, a polarization electric field $E_o$ is set up which gives the $E_o \times B$ drift necessary for propagation. It should be noted that the ion beam 40 will not propagate indefinitely in the vacuum region 20. Due to the cylindrical geometry, this polarization field has a component $E_1$, outside the beam parallel to B (see FIG. 3). This leads to forces on the beam such that the beam tends to expand along the magnetic field. As it expands, the density decreases so propagation becomes more difficult. This expansion along the magnetic field appears to be the dominant effect which limits the distance the beam can propagate in the vacuum region 20. An approximate expression for the time for the beam to expand by its own radius $a$ (in a direction of B) is given by $$\tau_{exp} = (\omega_{pi}/\Omega_i)(a/V_o) \qquad (4)$$

Multiplying equation (4) by the beam velocity $V_o$ will now give an approximate expression for the distance traveled by the beam in time $\tau_{exp}$. Reference is made to "Tokamak Plasma Heating with Intense Pulsed Ion Beams" Naval Research Laboratory Memorandum Report 3394 (October 1976), authored by the present inventors for a more detailed discussion of the derivation of $\tau_{ext}$ and other factors effecting beam propagation across the vacuum magnetic field.

After the beam 40 has propagated from the wall through the vacuum region 20, it must penetrate the tokamak plasma 16 and deposit its energy therein. Considering first the penetration of the ion beam into the tokamak plasma, reference is made to FIG. 4 which shows the beam 40 penetrating the plasma 16 as viewed in the direction of the toroidal magnetic field $B_t$. Each magnetic field line in the beam 40 must be at a different potential in order to maintain the polarization field $E_c$ which convects the beam. However, the potential of the tokamak plasma 16 (which surrounds the beam 40 as it enters the plasma) is the same on different field lines because the plasma is a good conductor. Therefore the tokamak plasma 16 attemps to short circuit the polarization field $E_o$ and stop the beam at the outside of the plasma, rather than the center. However, even if short circuiting occurs, a sufficiently intense beam will propagate through the tokamak plasma. Assuming that the polarization field $E_o$ is completely shorted out so that the forward motion of the beam 40 is converted to cyclotron motion, a diamagnetic current 42 is produced on the beam surface, which cancels the ambient tokamak magnetic field, allowing the rest of the beam to propagate through. The diamagnetic current 42 on the beam surface can exclude the tokamak magnetic field B as long as the beam energy density (which equals $\frac{1}{2}nMV_o^2$, where $n$ is the number of ions, M is the ion (proton) mass, and $V_o$ is the initial beam velocity, assuming the beam has traveled essentially unimpeded to this point) is larger than the tokamak magnetic-field energy density (which equals $B^2/2\mu_o$, where $\mu_o$ is the permeability of free space, and B is the tokamak magnetic field), or the unneutralized beam current is large enough to exclude the tokamak magnetic field. This reduces to $$V_o/V_A > 1 \qquad (5)$$

where $V_A$ is the Alfven speed in the beam, given by $V_A = \sqrt{B^2/\mu_o nM}$. If equation (5) is satisfied, the beam will exclude the magnetic field B as illustrated in FIG. 5 which shows the beam 40 in the tokamak plasma 16 as viewed looking toward the guide tube 34.

Figure 4:
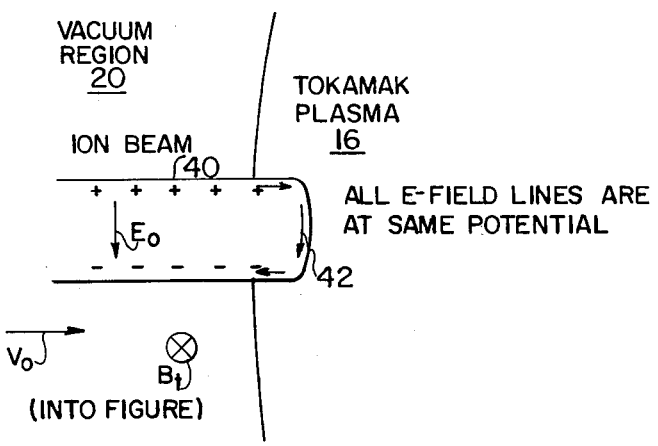
FIGS. 4 and 5 illustrate the ion beam penetrating the tokamak plasma.
Figure 5:
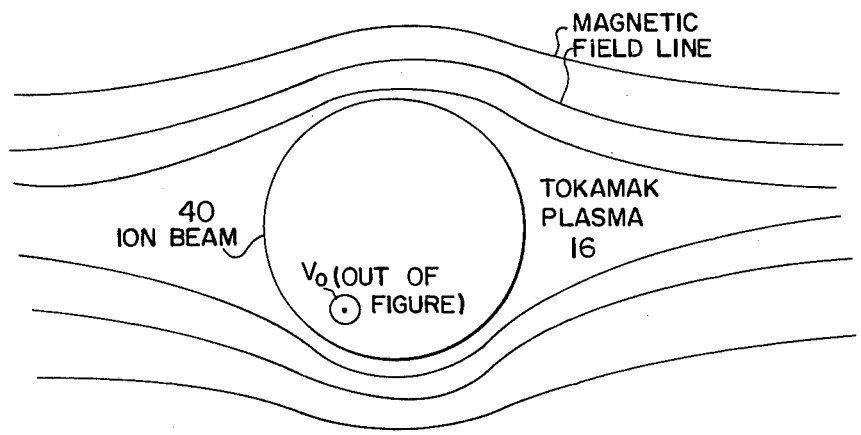

Considering now the deposition of the beam's energy within the tokamak plasma 16, a flow pattern such as shown in FIGS. 4 and 5 (there is a velocity discontinuity at the interface between the ion beam 40 and the plasma) may be unstable to the well known Kelvin-Helmholtz instability.

According to the Kelvin-Helmholtz instability, if the ion beam 40 and the plasma 16 do not interpenetrate, this flow pattern will be unstable as long as the beam velocity $V_o$ is less than $2\sqrt{2}\, V_A$ (Alfven speed). (If the ion beam and the plasma were to interpenetrate, the ion-ion instability holds that the flow pattern is unstable as long as the beam velocity $V_o$ is less than $2V_A$). Alternatively, the beam may deposit its energy by lauching magnetosonic shocks in the plasma if the beam energy density is larger than the magnetic-field energy density in the tokamak.

Figure 6:
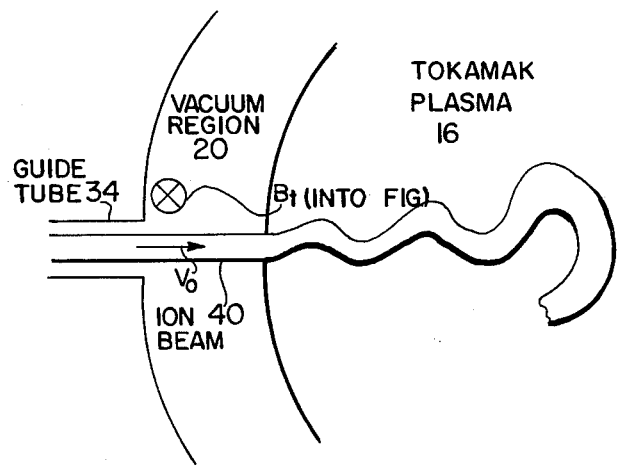
FIG. 6 illustrates deposition of the ion beam's energy in the interior of the tokamak plasma according to the Kelvin-Helmholtz instability.

As an example, if $V_o < 2\sqrt{2}\, V_A$, the spatial growth length of the Kelvin-Helmholtz instability is given by $$L_{KH}^{-1} \approx k_1 \frac{(\rho_p \rho_b)^{\frac{1}{2}}}{\rho_p + \rho_b}$$

where $\rho_p{}^b$ and $\rho_b{}^p$ are mass densities of the beam 40 and the plasma 16, respectively, and $k_1$ is a wave number ($2\pi/\lambda$, $\lambda$ being the wavelength.) Assuming that the wave number $k_1$ which gives the most effective mixing is $k_1 \simeq a^{-1}$, $L_{KH} \simeq a(\rho_b + \rho_p)/(\rho_b \rho_p)^{\frac{1}{2}}$, where $a$ is the beam radius. Assuming that about five growth lengths are needed to mix the beam and the plasma, a beam radius $a$ and beam density $n$ can be chosen so that $$a^{-1} \int_0^{r_o} d_r [\rho_b \rho_p(r)]^{\frac{1}{2}} / [\rho_b + \rho_p(r)] \simeq 5 \quad (6)$$

where $r_o$ is the radius of the plasma. This is an approximate condition for the beam to propagate to the plasma interior and deposit its energy there. If the beam and central plasma densities are equal, then from Equation (6), the beam radius $a$ should be about one tenth of the plasma radius, assuming a plasma density profile of the form $\rho_p(r) = \rho_p(o)(1 - (r/r_o)^2)$. FIG. 6 is a representation of the beam 40 mixing with the plasma 16 as viewed from within the toroidal chamber 14 looking in the direction of the toroidal magnetic field $B_t$ according to the Kelvin-Helmholtz instability.

An example of heating a reactor to a temperature of 10 keV with intense, pulsed ion beams will now be considered. Assuming a pulse time $\tau$, the total energy of the ion beam pulse is $E_b = VI_b\rho$, where V is the voltage applied to the ion accelerator means 22 and $I_b$ is the beam current. Substituting the relationships of Equations (1) and (3) in this expression, $E_b$ is given by $$E_b = 2 \times 10^{-10}(\pi a^2)V^{3/2}\tau n_o \quad \text{(megajoules)}$$

where $\pi a^2$ is the cross-sectional area of the beam and $n_o$ is the beam density. If the tokamak plasma has a major radius R and a minor radius $r_o$ (both in centimeters), and an average density $n$ (in centimeters$^{-3}$), then the energy in megajoules to heat the electrons and ions in the plasma to a temperature of 10 keV is $E_p = 2$ (Energy per particle) ($\bar{n}$ (in electrons)) (volume of plasma) or $$E_p = 6.4 \times 10^{-21} \bar{n} \pi^2 r_o^2 R$$

For voltage of 5 megavolts $r_o/a = 10$, $\bar{n}/n_o = 0.5$, and $\tau = 3 \times 10^{-8}$ seconds, about 10 pulses are required for a reactor having a major radius of 5 meters. If the central plasma (and beam) density is $5 \times 10^{-13}$ cm$^{-3}$, and the magnetic field B is $5 \times 10^4$ Gauss, Equations (5) and (6) are satisfied, $V_o < 2\sqrt{2}\,V_A$, and $(\omega_{pi}/\Omega_i)^2 \simeq 20$. Thus the beam should deposit its energy near the center of the plasma. Using equation (3), the anode-cathode gap $d$ is found to be $d \simeq 0.1 a^{\frac{1}{2}}$ cm.

Although the present invention has been described with application to the heating of a tokamak-confined plasma, those skilled in the art will recognize that the present invention can be used with other fusion schemes in which a plasma is confined in a magnetic field, specifically, linear plasma-confining magnetic field devices (magnetic mirrors) or other toroidal confining devices such as tormak or surmac.

It is also noted that for ion beam heating of tokamaks there are many possible parameters to vary including voltage, current, pulse time, beam radius and injection angle. This flexibility increases the likelihood that parameters can be found for which the beam will propagate to the center of the plasma and deposit its energy there.

It is obvious that many modifications and variations of the present invention are possible in light of the above teachings. It is therefore to be understood that within the scope of the appended claims the invention may be practiced otherwise than as described.

What is claimed and desired to be secured by Letters Patent of the United States is:

1. Apparatus for heating a plasma, said plasma being confined in an apparatus of the type wherein said plasma is confined in a vacuum chamber by a magnetic field and a vacuum region is formed surrounding said plasma, which comprises:
   means for producing a space-charge-neutralized, pulsed, ion beam; and
   means for directing said ion beam into the magnetic field,
   said ion beam being formed so that
   the square of the ion frequency of said beam is very much larger than the square of the gyrofrequency of said beam in the magnetic field, thereby producing a polarization electric field in said beam when it enters the magnetic field, said polarization field enabling said beam to propagate across the vacuum region,
   the velocity of said beam is greater than the Alfven speed of said beam in the magnetic field so that said beam will penetrate said plasma,
   and the velocity of said beam is less than $2\sqrt{2}$ times the Alfven speed of said beam in the magnetic field so that said beam will deposit its energy in the interior of said plasma.

2. The apparatus recited in claim 1, wherein said ion beam is directed into the magnetic field along a trajectory generally perpendicular to the lines of force on the magnetic field.

3. A method for heating a plasma confined in a magnetic field, the magnetic field confining said plasma so that a vacuum region is formed surrounding said plasma, which comprises:
   producing a space-charge-neutralized, pulsed ion beam; and
   injecting said beam into the magnetic field,
   said ion beam being further characterized by
   the square of the ion frequency of said beam being very much larger than the square of the gyrofrequency of said beam in the magnetic field, thereby producing a polarization electric field in said beam when it enters the magnetic field, said polarization field enabling said beam to propagate across the vacuum region, and
   the velocity of said beam being greater than the Alfven speed of said beam in the magnetic field and less than $2\sqrt{2}$ times the Alfven speed of said beam in the magnetic field, whereby said ion beam will penetrate said plasma and will deposit its energy in the interior of said plasma.

* * * * *